Patented May 22, 1951

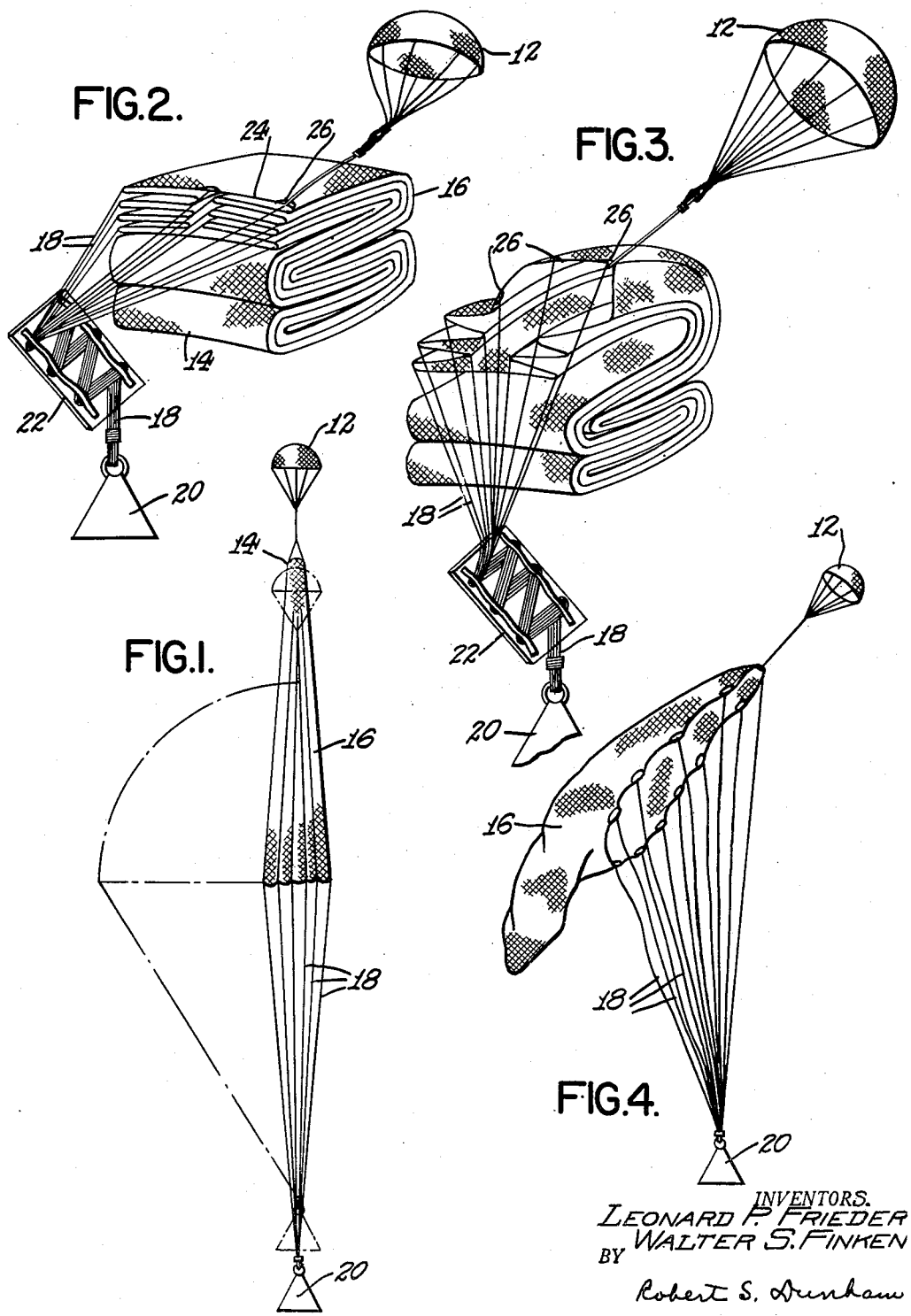

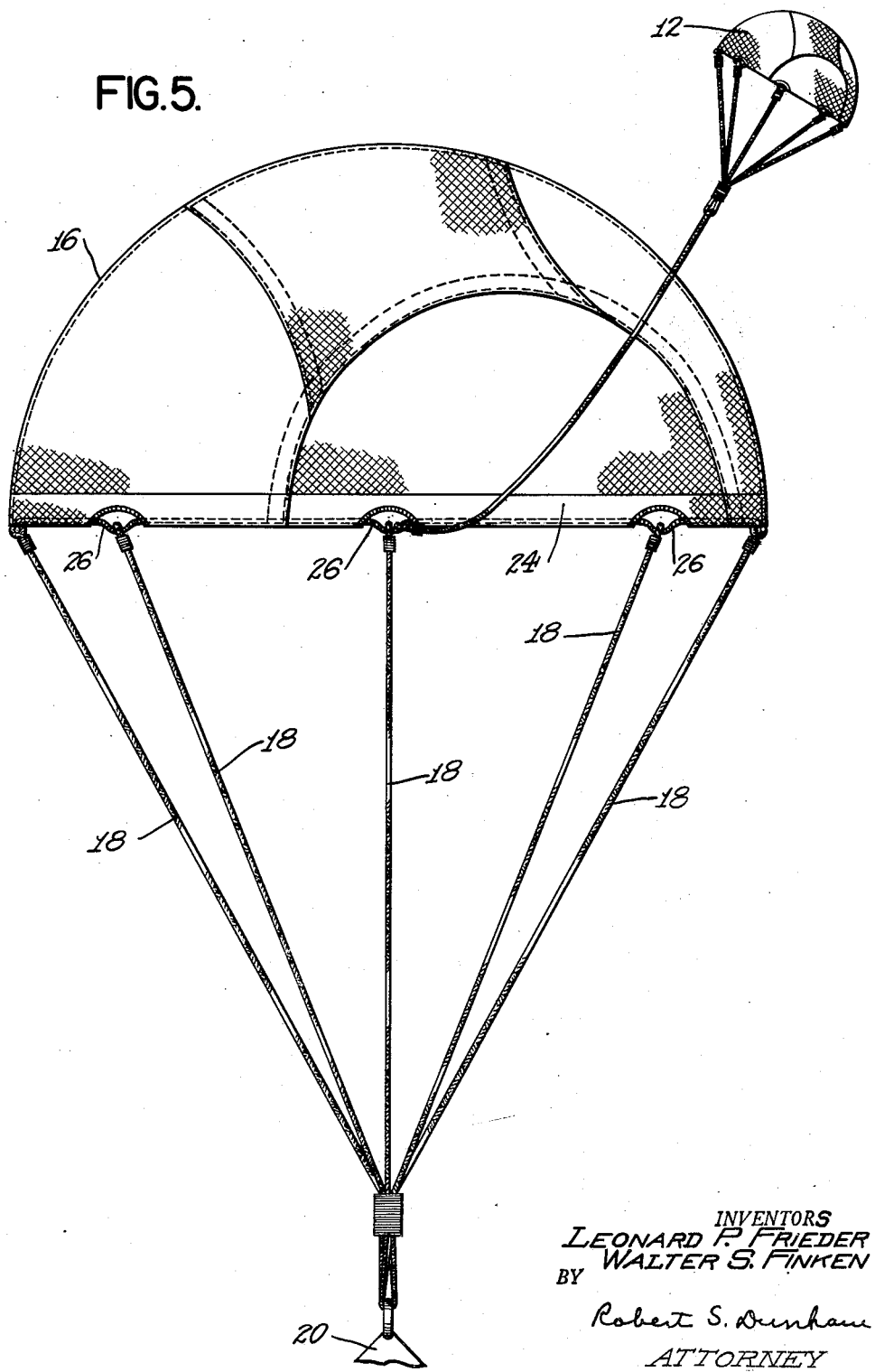

2,553,909

UNITED STATES PATENT OFFICE 2,553,909

PILOT CHUTE ATTACHED TO RIM OF MASTER PARACHUTE

Leonard P. Frieder, Great Neck, and Walter S. Finken, Brooklyn, N. Y., assignors, by mesne assignments, to Reconstruction Finance Corporation, Philadelphia, Pa., a corporation of the United States Application December 27, 1946, Serial No. 718,746

3 Claims. (Cl. 244—148)

This invention pertains to the launching of parachutes from elevations such as towers, bridges, aircraft, etc. with particular reference to an improved method of using the pilot parachute in order to aid the canopy of the main parachute to open.

The conventional method has been to attach the pilot chute to the crown of the canopy. That arrangement, after launching, puts the canopy in tension between the pilot chute above it, and the load below it, causing the assembly of pilot chute, canopy and load to stream and thereby prevent prompt opening of the canopy.

In the present invention the pilot chute is attached, not to the crown of the canopy, but to the hem forming the outer rim of the canopy, the canopy being so packed in a container that the pilot chute will lift the packed folds in such manner that the canopy is limp, flexible, and freely inflatable by the air through which it is moving.

The invention greatly reduces the required time and falling distance for obtaining full inflation, thereby permitting discharge of loads at lower altitudes, insuring definite position of the parachute relative to the wind direction, and preventing streamlining of the canopy.

Further and other objects and advantages will be apparent from the specification and claims, and from the accompanying drawings which are drawn only to illustrate the lifting effect obtained by the pilot parachute when attached to the rim of the master parachute canopy. Prior to use the master and pilot parachutes are usually folded together in an appropriate pack (personnel pack, cargo pack, airplane pack, etc.) with the pilot parachute attached to the rim of the master canopy by a cable of appropriate length.

The drawings illustrate the canopy folded with its crown at the bottom and its rim at the top of the pack. Depending upon conditions the pack may be otherwise arranged, an essential condition being the attachment of the pilot parachute to the rim of the master canopy, in such manner that the pilot parachute will always open in the main canopy into the air stream at the proper stage of the launching operation.

In the drawings:

Fig. 1 illustrates the streamline condition which takes place in conventional devices;

Fig. 2 shows the canopy pack, with pilot chute about to begin opening the canopy;

Figs. 3 and 4 show intermediate stages of the opening of the canopy; and

Fig. 5 illustrates the parachute and pilot chute after the launching operation is complete.

One of the objects of this invention is to prevent the streamline condition illustrated in Fig. 1, in which the pilot chute 12 is connected to the crown 14 of the canopy 16, the canopy being connected by shroud lines 18 to the load 20. Such an arrangement stresses the fabric of the canopy parallel with the lines of force, thus requiring great inflational effort to open the canopy and to have power enough available to draw pilot chute 12 and load 20 towards each other other from their full line positions to their broken line positions.

In the present invention the pilot chute is attached not to the crown of the canopy but to its rim, and consequently there is no center line stress placed on the fabric of the canopy, and the canopy does not stream.

Fig. 2 shows the operation of the invention at a very early stage of its operation. The shroud lines 18 had been packed in an appropriate manner, with the canopy 16 folded with its rim down. Then the canopy was turned upside down so that its crown 16, instead of its rim 24, was at the bottom of the pack. The pilot chute 12 was attached at 26 to the outermost fold of the rim. The pilot chute 12 when released by the operator merely lifts a fold of the canopy into the air stream at the proper time, and the air stream itself does the work of pulling the canopy from the pack into its final form as in Fig. 5. Intermediate steps of the opening process are shown in Figs. 3 and 4.

Since the loading is on the rim, which is the strongest part of the canopy, a fast and sure opening is assured without damage to the canopy, and after the canopy has been fully withdrawn from the pack, as in Fig. 4, the pilot parachute 12 on account of its attachment to the rim, instead of to the crown, of the canopy, keeps the canopy open in flight.

What is claimed is:

1. Parachute apparatus adapted for launching from an altitude, comprising in combination, a main parachute having a canopy and an outer rim, and a single pilot parachute only, said pilot parachute being attached to the main parachute only at said rim thereof, said main parachute having shroud means distributed around its rim and adapted to extend therefrom to a load, said pilot parachute being attached only at a predetermined region of the rim and being adapted, upon inflation, to exert pulling force on that portion of the shroud line means which is adjacent said region, and said pilot parachute having permanent connecting means attaching the pilot parachute at said rim of the main parachute and only at said rim, so that said pilot parachute remains attached at said rim until and after said main parachute has fully deployed into complete supporting relation to the load.

2. Packed parachute apparatus adapted for launching from an altitude, comprising, in combination, a main parachute having a canopy and an outer rim, said canopy having a crown, and a single pilot parachute only, attached to the main parachute only at the rim thereof, said main parachute and pilot parachute being associated in packed relation with the pilot parachute at one face of the pack for immediate release and inflation of said pilot parachute upon release of the pack, and said main parachute being folded in said packed relation with its crown substantially at the other face of the pack and with its rim adjacent the pilot parachute so that the latter, upon release and inflation, first pulls out the rim of the main parachute for preliminary untensioned deployment of the main parachute into position for natural inflation as the released parachute apparatus descends in the air.

3. Packed parachute apparatus adapted for launching from an altitude, comprising, in combination, a main parachute having a canopy and an outer rim, said canopy having a crown, and a single pilot parachute only, connecting means attaching the pilot parachute to the main parachute at the rim of the main parachute and only at said rim, said connecting means comprising means maintaining said attached relation of the pilot parachute at said rim at least until the main parachute has been deployed into fully-tensioned, load-supporting relation, said main parachute and pilot parachute being associated in packed assembly, said pilot parachute being arranged in said assembly for release prior to release of the main parachute, said pilot parachute upon release being adapted to exert withdrawing force on said connecting means, said main parachute being folded in said assembly with its rim first accessible, and with its crown only subsequently accessible, in the direction in which the released pilot parachute draws the connecting means, so that the pilot parachute, upon release and inflation, first pulls out the rim of the main parachute for preliminary untensioned deployment of the main parachute into position for natural inflation as the released parachute apparatus descends in the air.

LEONARD P. FRIEDER.
WALTER S. FINKEN.

REFERENCES CITED

The following references are of record in the file of this patent:

UNITED STATES PATENTS

| Number | Name | Date |
| --- | --- | --- |
| 1,273,553 | Upson | July 23, 1918 |
| 1,323,983 | Irvin | Dec. 2, 1919 |
| 1,895,999 | Kuhlemann | Jan. 31, 1933 |
| 2,028,777 | Hoffmann | Jan. 28, 1936 |
| 2,032,824 | Adams | Mar. 3, 1936 |
| 2,362,488 | Jahn | Nov. 14, 1944 |
| 2,410,057 | Frieder | Oct. 29, 1946 |

FOREIGN PATENTS

| Number | Country | Date |
| --- | --- | --- |
| 155,787 | Great Britain | Dec. 23, 1920 |